United States Patent [19]

Fletcher et al.

[11] 4,046,529

[45] Sept. 6, 1977

[54] REGENERABLE DEVICE FOR SCRUBBING BREATHABLE AIR OF $CO_2$ AND MOISTURE WITHOUT SPECIAL HEAT EXCHANGER EQUIPMENT

[76] Inventors: James C. Fletcher, Administrator of the National Aeronautics and Space Administration, with respect to an invention of; Edward H. Tepper, Granby, Conn.

[21] Appl. No.: 688,854

[22] Filed: May 21, 1976

[51] Int. Cl.² .......................... B01D 53/02; F28F 3/02
[52] U.S. Cl. ...................................... 55/179; 55/269; 165/166
[58] Field of Search ................ 55/33, 58, 68, 74, 179, 55/195, 269, 387; 165/166; 75/20 F; 252/447

[56] References Cited

U.S. PATENT DOCUMENTS

| | | | |
|---|---|---|---|
| 2,793,949 | 5/1957 | Imich | 75/20 F X |
| 2,983,597 | 5/1961 | Elliott | 75/20 F |
| 3,323,288 | 6/1967 | Cheung et al. | 55/179 X |
| 3,355,860 | 12/1967 | Arnoldi | 55/31 |
| 3,384,463 | 5/1968 | Olstowski et al. | 75/20 F X |
| 3,498,024 | 3/1970 | Calvert, Sr. | 55/33 |
| 3,533,221 | 10/1970 | Tamura | 55/68 X |
| 3,587,730 | 6/1971 | Milton | 165/166 X |
| 3,613,782 | 10/1971 | Mason et al. | 165/166 |
| 3,659,400 | 5/1972 | Kester | 55/68 X |

*Primary Examiner*—Thomas G. Wyse
*Assistant Examiner*—Robert H. Spitzer
*Attorney, Agent, or Firm*—Marvin J. Marnock; John R. Manning; Marvin F. Matthews

[57] ABSTRACT

The device concerns the circulation of cabin air through canisters which absorb and adsorb carbon dioxide, together with excess moisture, and return the scrubbed air to the cabin for recirculation. A coating on an inert substrate in granular form absorbs and adsorbs the impurities at standard temperatures and pressures, but desorbs such impurities at low pressures (vacuum) and standard temperatures. This fact is exploited by making the device in a stack of cells consisting of layers or cells which are isolated from one another flow-wise and are connected to separate manifolds and valving systems into two separate subsets. A first subset may be connected for the flow of breathable air therethrough until the polyethyleneimine of its cells is saturated with $CO_2$ and $H_2O$. During the same period the second subset of cells is manifolded to a vacuum source. After the first period the first subset is re-valved to connect it to the vacuum system to draw off the collected impurities, while the newly purified subset B is connected to the breathable air of the cabin. These phases or half cycles are repeated, making it unnecessary to collect and discard any used-up materials. The cells of the device are separated from one another by sheets of a lightweight but impervious metal which is both physically strong and a good conductor of heat. To assist in the heat transfer process, a high conductivity foamed metal is disposed throughout the polyethyleneimine bed of each stratum, such foamed metal being formed into blocks which preferably touch both the upper and lower parting sheets defining the cell, to transfer heat to both the superior cell and the inferior cell so that the stack of cells operates essentially isothermally.

4 Claims, 6 Drawing Figures

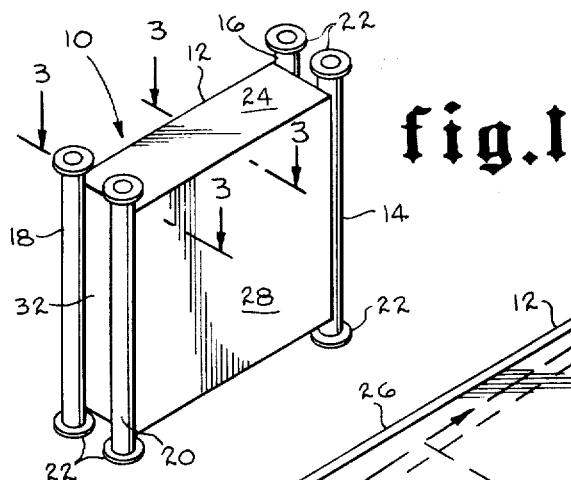
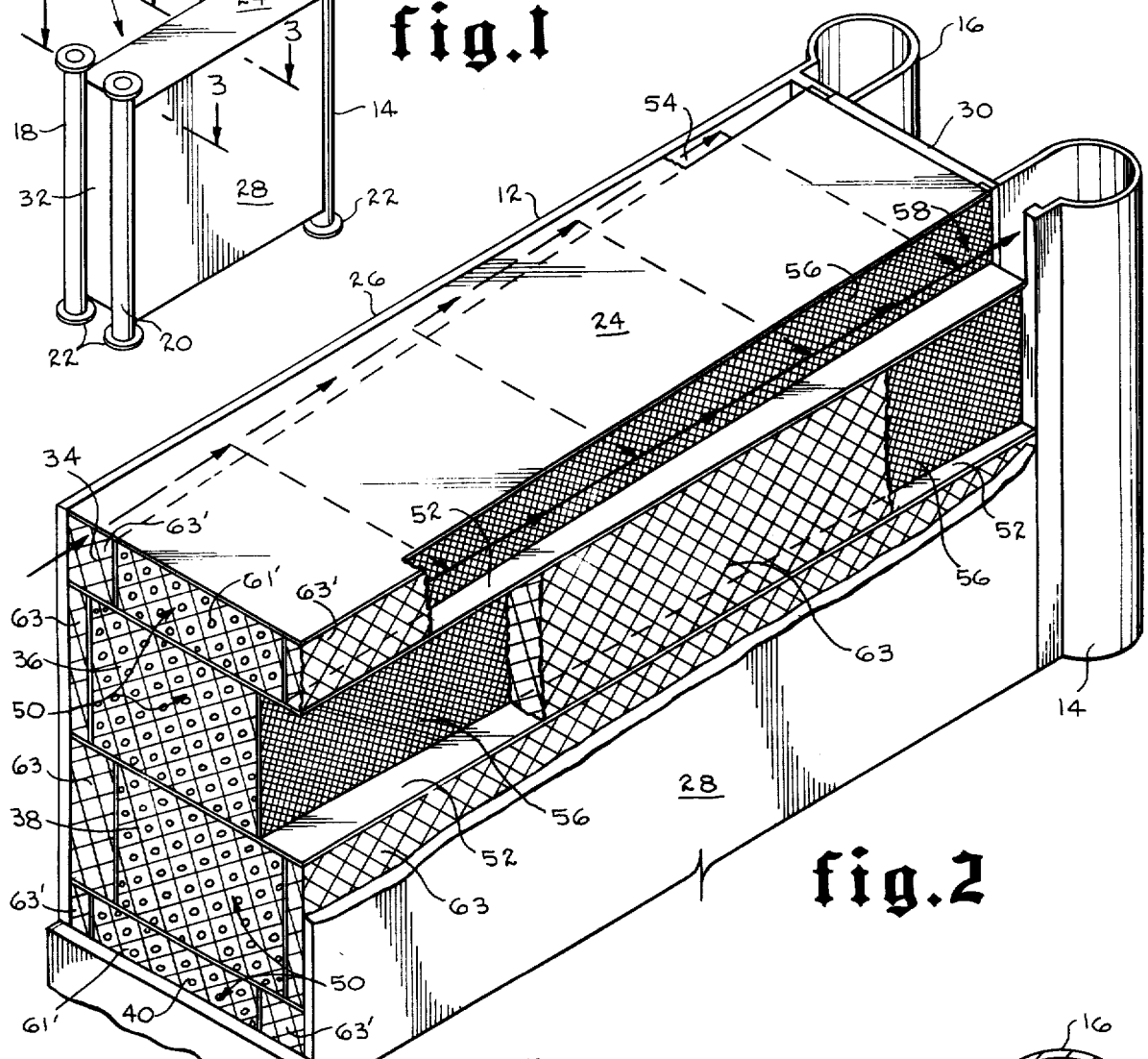
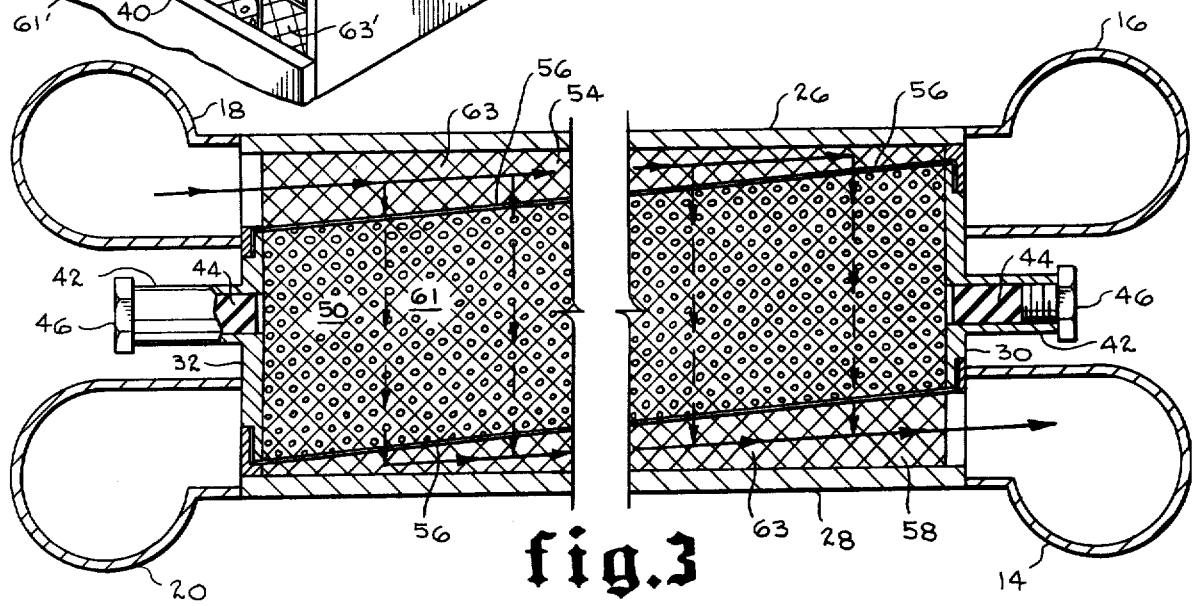

LEGEND
- • FLOW-THRU CONNECTION
- ⊕ VALVE CLOSED
- ⊖ VALVE OPEN
- —— FLOW FROM AND TO CABIN
- —— VACUUM FLOW LINES
- --- INACTIVE CONDUIT

REGENERABLE DEVICE FOR SCRUBBING BREATHABLE AIR OF $CO_2$ AND MOISTURE WITHOUT SPECIAL HEAT EXCHANGER EQUIPMENT

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 45 USC 2547).

BACKGROUND OF THE INVENTION

1. Field of the Invention

The present invention lies in the field of life support systems, and more specifically concerns the systems which affect and control the air breathed by human beings within an enclosure. It has broad application to any "air conditioning" system which includes a suction or vacuum subsystem, and has particular application to spacecraft and other interplanetary and planet-orbiting vehicles, operating in a vacuum or rarefied atmosphere. Even more specifically, the invention deals with methods and means for reducing the concentration of carbon dioxide ($CO_2$) in a flowing breathable airstream, and also removing excess moisture from the airstream, and at the same time not affecting the control of the temperature of said airstream.

2. Description of the Prior Art

One known technique for scrubbing $CO_2$ out of an airflow is by filtering the air through a chemisorbent material such as lithium hydroxide (LiOH). While this technique is feasible under certain circumstances, it has the major disadvantage that the LiOH filter is not regenerable; a permanent, non-reversable reaction takes place, with the result that the material is consumed and must be discarded and replaced with fresh material. This advantage is particularly obnoxious in a space craft, as it exacts a considerable weight penalty; the larger the crew, the more filter material must be packed into the ship at launch time. Also, the use of a non-regenerable filter material limits the space mission in various other respects, e.g., the duration of the flight and the other equipment which must be limited to make room for the consumable filter material.

In the same prior art system, it has been common to remove excess moisture from the breathable air by passing it through a condensing heat exchanger. Again a weight penalty is paid, and in addition there is a waste of energy. Some means is desired to make the $CO_2$ scrubber material usable over and over again and, as a side benefit, to extract $H_2O$ at the same time. It is also desirable not to be obliged to supply heat to one part of the system or to remove it from another, as each of these steps implies the need for additional equipment and materials, and such equipment and materials extract another weight penalty.

SUMMARY OF THE INVENTION

In the present invention a structure which might be called a heat exchanging canister is provided, and such canister is stratified into a multiplicity of layers or cells which are stacked on top of one another so that no air or other fluid can flow from one cell to the next, but which are separated from one another only by metallic barriers or parting sheets which permit and even encourage the flow of heat, in a direction normal to the airflow. Each cell is approximately parallelepiped in shape, and airflow between a pair of opposed surfaces is promoted by defining such surfaces with very fine wire screen, fine enough to encourage airflow but at the same time preventing the flow of a fine granular material which occupies most of the space within each cell. Such material is approximately of the consistency and granule size of a fine, dry sand, e.g., 30 - 40 mesh U.S. Sieve Series, but is considerably less dense and has a much greater surface area.

Each granule is preferably made of an inert substrate or core on which is added a coating of active material, the core material being selected primarily from those having multiple reentrant contours, i.e., a large surface area, such as the "Amberlite" XAD7 a polymeric adsorbent marketed by Rohm and Haas Company, which in the indicated size range has a surface area in the neighborhood of 450 square meters for each gram of material, a truly remarkable surface area. The coating applied to the core granule has a minimal thickness, and is selected primarily from those which will adsorb and/or absorb $CO_2$ at standard temperature and pressure, but a later time will readily release the lightly-bound gas when the pressure is reduced to a relatively low vacuum. It is something of a bonus if the same granules will also remove $H_2O$ and give it up under the corresponding sets of circumstances, and in fact the inventor has found that this actually occurs, with the preferred sorbent materials.

A particularly suitable active coating material is a polyethyleneimine, one such material being made and marketed by the Dow Chemical Company under the designation "PEI18", an amber colored substance which is a viscous liquid at standard temperature and pressure. Finished granules as thus coated have a bulk density of 0.378 grams per cubic centimeter (cc), and flow as readily as water, easily and completely filling any canister cell into which they are poured, even though the canister may be structurally subdivided into a multiplicity of tiny pores.

The technique for coating the PEI18 polyethyleneimine on the XAD7 has been developed by applicant's corporate employer, and the resulting granules or bulk material is presently designated "HS-C."

The use of somewhat similar granules for analogous purposes is not entirely unknown to the prior art, a particular application having been disclosed in U.S. Pat. No. 3,659,400, issued May 2, 1972, to Frank L. Kester and assigned to United Aircraft Corporation, the former name of the inventor's employer's parent company. This reference described a regenerable $CO_2$ sorption — desorption device utilizing granules of polyethyleneimine on a substrate of a polymerized divinylbenzene, the material being alternately exposed to cabin air for sorption and vacuum for desorption. The reference is completely silent, however, about structure disclosed in the present application for retaining the active granules and structures for the transfer of heat between layers or beds of the material. As indicated in the reference, the exact nature of the sorption process is not known, but is believed to be a combination of adsorption and absorption.

The heat transfer structures of the present invention is probably more important than any other, particularly in view of the fact that the inventor's companion application, Ser. No. 688,855, filed concurrently herewith, discloses and claims structure and methods substantially identical with those herein, the exception being that such companion application makes use of a somewhat more conventional heat exchange structure, namely metal fins. In the present application, the inventor discloses and claims combinations which include foamed metals as the heat exchange medium. Such foamed metals are cut into blocks of the appropriate dimensions with very reasonable tolerances, and do a very adequate job of transferring heat liberated in a cell operating in the sorbing mode to its upper and lower neighbors operating in the desorbing mode. At the same time, they do not interfere with the filling of and retention by the cell with the active granules, as such granules may be poured into the metal sponge to fill all the small spaces therein, as completely as water would do. All that is necessary to finish a cell is to cover two opposed surfaces with a pair of fine metal screens for the inflow and outflow of air, such screen having openings which will not permit the granules to leak out or act as plugs.

It should also be noted that such foamed metal or metal sponge has such good mechanical strength as to permit two significant improvements. One, they may be made longer than metal fins, i.e., in the heat flow direction. Two, they provide a homogenous matrix completely across the internal space between the outer walls of the casing or canister of the entire device, making it possible to use very thin parting sheets to separate one cell from another. The real structural strength lies in the metal sponge, while the parting sheets act only as seals.

BRIEF DESCRIPTION OF THE DRAWING

The present disclosure includes an attached drawing, and the reader will perhaps more readily comprehend the present invention by examining the drawing figures in connection with the detailed description thereof, infra. In the drawing:

FIG. 1 is a foreshortened perspective view of a preferred embodiment of a module or canister forming a part of the present invention.

FIG. 2 is an enlarged perspective view of the same embodiment with portions of the same removed and shown in section to reveal internal structural details.

FIG. 3 is a longitudinal (horizontal) section of the same embodiment the sectioning plane being defined by the four section lines and arrows designated in "3—3—3—3" in FIG. 1, passing through the next-to-top cell of the stack.

DETAILED DESCRIPTION OF THE DRAWING

Figure 4:
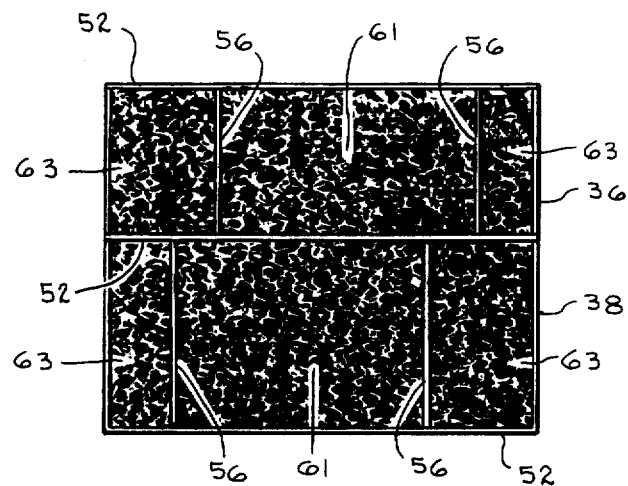
FIG. 4 is a detail showing in perspective view the heat conductive foamed metal in a pair of adjacent cells of a canister of the invention.

The module 10 shown in FIG. 1 consists of a canister 12 having the four vertical manifolds 14, 16, 18, and 20 integrally connected to the canister at its four vertical edges. For convenience in assembly, each of the four manifolds is shown terminating in a pair of flanges 22 just above and below the canister body. Module 10 is structurally self-sufficient as shown, although of course brackets may be needed if the module is to be secured to a wall or bulkhead.

As will be evident from FIG. 2, the canister is generally rectangular parallelepiped in shape, having the usual six surfaces in three parallel pairs consisting of upper and lower closure plates 24 (bottom not shown), side walls 26 and 28, and end closure plates 30 and 32. These six wall members (preferably of aluminum in spacecraft use) are joined and sealed together to form what would be, were it not for the manifolds and other openings to be discussed below, a leaktight box.

It should first be mentioned that the canister 12 is divided into a number of horizontally stratified layers or cells, numbered 34, 36, 38 and 40 from top to bottom in FIG. 2, and that each cell is provided with a pair of integral filler necks 42 (shown only in FIG. 3) into each of which is jammed a Neoprene plug 44 held in place by a cap screw 46 screwed into threads on the inner surface of neck 42. These necks are used when charging or emptying the cells with the sorbent granular material 50, about which more below. It will be noted from FIGS. 2 and 3 that each of the cells is defined by one or more horizontal parting sheets 52 which are coextensive with the upper and bottom closure plates, i.e., each parting sheet 52 extends completely between side walls 26 and 28, and between end closures 30 and 32, and is brazed or otherwise secured to these wall members so that each cell is flow-isolated from both its neighbors in the stack; no air granular material can flow up to its neighbor on the floor above, nor drop through a parting sheet to its lower neighbor.

These same figures, in particular FIG. 3, which is a horizontal section through the next-to-top cell 36, make clear that of the four manifolds only a polygonally opposed pair are flow connected to any one cell. Thus in cell 36 the flow may follow the direction indicated by the arrows, entering from manifold 18, passing through the internal convergent space 54, through the fine screen 56, across the bulk granular material 50, between the screens, and exiting through a second screen 56, divergent internal passageway 58, and manifold 14. Each manifold is secured in a leaktight fashion to canister 12, and it should be noted regarding cell 36 that the other pair of manifolds 16 and 20 are blocked from this cell by the end walls 30 and 32.

Screens 56 are preferably made of a very fine aluminum screen, the openings of which are just small enough but not smaller than that required to prevent the passage through or blockage by the granules 50. The openings in each screen are preferably very closely spaced, so that the pressure drop over the screens will be minimal. A suitable material is expanded AAll45 aluminum in a 0.005 inch thickness, having openings of 0.009 inch diagonally spaced with 30 percent open area.

FIGS. 2 and 3 show a canister in which the upper layer 34 and bottom layer 40 are only about half as thick as the center cells 36 and 38. This is for heat transfer purposes, as the outside cells transport heat only to one neighbor each, whereas the interior cells 36 and 38 transport heat both upward and downward, to two neighbors apiece. The granular sorbent material 50 is not a particularly good heat conductor, so most if not all of the heat flow is through the foamed metal or metal sponge 61 and 63 which occupies the same compartments as the granular material 50 but cannot easily be shown because of the difficulty of illustrating these two intermingled masses as separate items. The granules are, of course, a comminuted material whereas the foamed metal is a reticulated cohesive mass of metal wires all joined together and defining a multiplicity of interconnected spaces. (A chemist frequently speaks of a solvent as a "continous" phase and a solute as a "discontinuous" phase, but in the present instance both phase are continous, as might be true of a mixture of two liquids such as water and grain alchol.) It should be noted from FIGS. 2 and 3 that the metal sponge may completely fill the air passages 54 and 58 (made in separate triangular pieces from the block filling the space between the two screens 56), as illustrated. This is actually the preferred construction, as the strength of the metal sponge makes it possible to use thinner parting sheets 52 than is possible with the unsupported parting sheets used with the fin type heat transfer structure of the concurrently filed application of the present inventor.

Various forms of foamed metal may be utilized, important characteristics being low weight, high thermal conductivity and a modicum of structural strength. A particular foamed aluminum found eminently suitable for embodiments of the present invention is known as Duocel, a product of Energy Research and Generation, Inc., of Oakland, Calif. This material may be cut into usable blocks as thick as 2 inches (5.08 cm.) in the heat transfer direction, and has a compression strength of 800 psi. It has the form of reticulated network of spaces of duodecahedral configuration in which the spaces are all interconnected and the metal defining the edges of the spaces form a continuous wire network, the wires having an average diameter of 0.033 cm. while the spaces average about 0.2 cm. in diameter. The result is a cake or sponge of tough metal in which the metal occupies only about 4% of the available volume, and yet conducts exothermic energy so well from a sorbing cell to its desorbing neighbors that the stack of cells operates essentially isothermally, maintaining an approximately constant mean average temperature and requiring neither the addition or removal of heat from the stream of cabin air. At the same time, almost all of the volume of each cell is available for the sorbing material which scrubs or purifies the air.

The nature of the foamed metal blocks 61 and 63 can perhaps be seen better in the somewhat enlarged end view of the FIG. 4. In this figure the sponge metal blocks next-to-top cell 36 and next-to-bottom cell 38 are shown, together with the three parting sheets 52, and the screens 56. This view shows one center block 61 and two edge blocks center of the foamed metal in each cell, the blocks differing from one another only in orientation.

Figure 5:
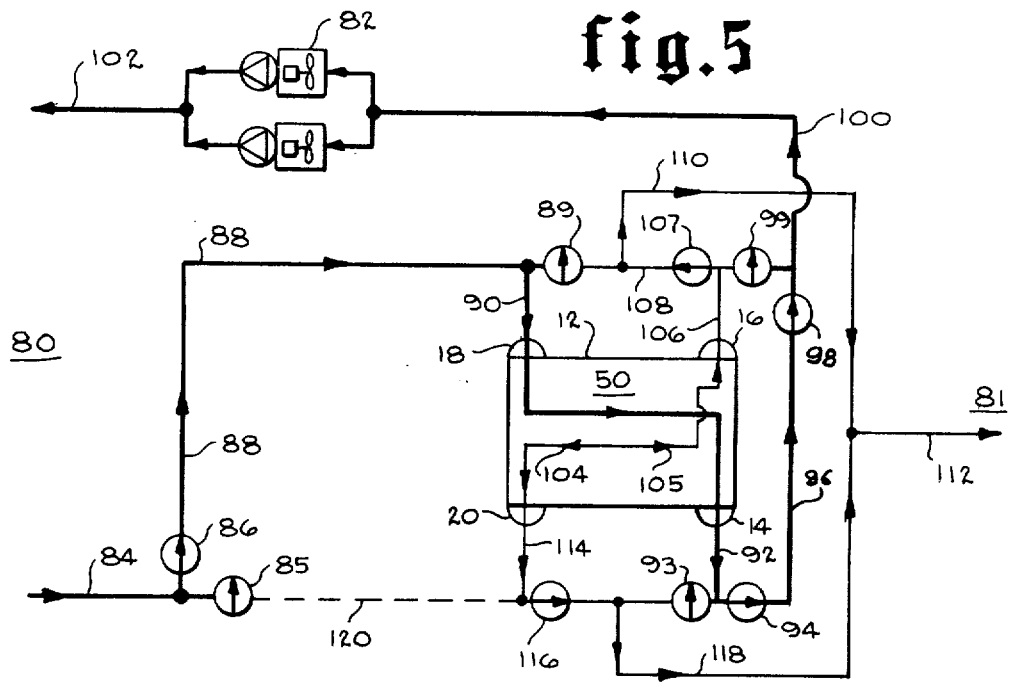
FIGS. 5 and 6 are simplified flow diagrams, in schematic form, showing how flow valves can be manipulated so that the breathable air from the cabin or other enclosure for mammals (or other air-breathing organisms) can first be directed through one subset of the canister cells, and later through a second such subset, while during these same respective phases the second subset of cells is first purged by a vacuum pump or by exposure to space vacuum, and then, in the second phase of the cycle, the valving is switched so that the first subset is vacuum purged.
Figure 6:
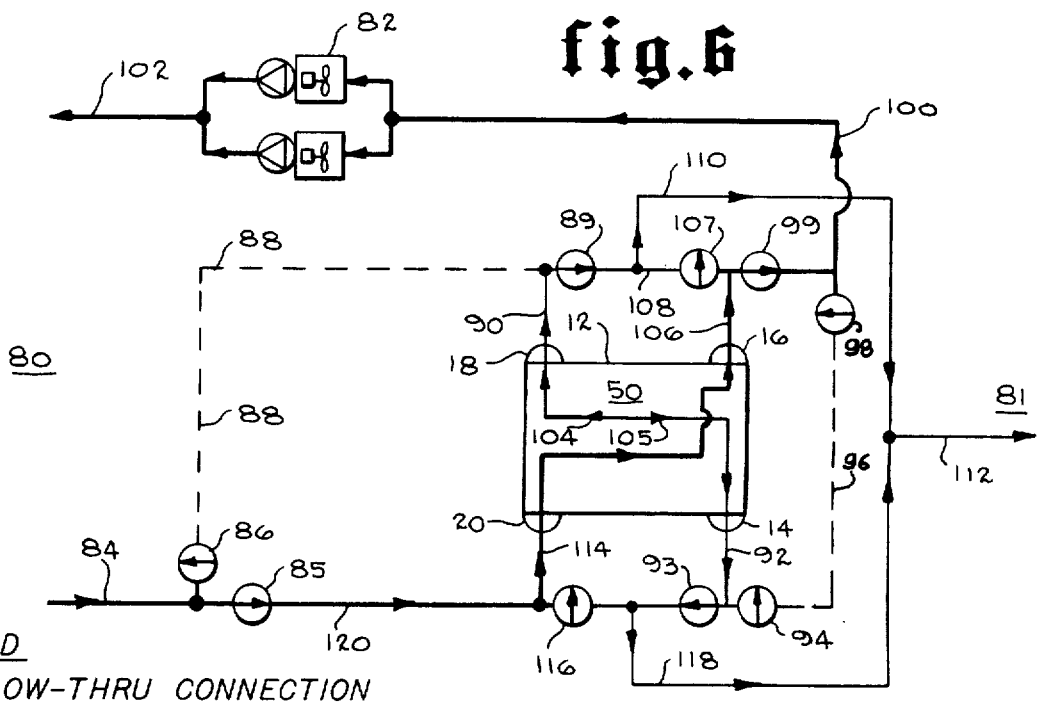

Directing the reader's attention now to FIGS. 5 and 6, it will be seen that the designation 80 has been used to symbolize an enclosure inhabited by air-breathing organisms, e.g., the room of a home office, an automobile or the cabin of a spacecraft. In each figure a very heavy line has been used to designate the path through which the cabin air is forced by the fans or blowers 82. As indicated by the "Legend" forming a part of FIG. 5, which legend is also applicable to the other figure, a lighter weight line is used to indicate the flow path to space vacuum or a vacuum pump, while a dashed line indicates a pipe or conduit which has been rendered inactive by the closing of a valve during one phase of the overall cycle. Since there are only two phases per cycle, a phase is synonomous with the term "half-cycle."

Starting in the lower left corner of FIG. 5, for example, it will be seen that during the half-cycle represented by this figure breathable air passes into conduit 84, is blocked by closed valve 85, but passes through open valves 86 into conduit 88, is blocked by closed valve 89 but passes through conduit 90 into canister 12 via manifold 18, entering, e.g., cells 36 and 40 of the prior figures. The air passes through these cells and is purified by them, and leaves the canister by way of manifold 14 to enter conduit 92. Thereafter it is blocked by closed valve 93 but passes through open valve 94 to enter conduit 96, passes through open valve 98 (blocked by closed valve 99) into conduit 100 and finally is blown through fans 82 and conduit 102 back to the cabin or other enclosure 80.

During the same half-cycle as is represented by FIG. 5, flow commences in both directions from the center of cells 34 and 38, and indicated by the opposed arrows 104 and 105 within canister 12. Part of the air (including some oxygen, which becomes waste or "ullage") is sucked, along with $CO_2$ and $H_2O$, to the right in the figure, exits the canister by manifold 16 into conduit 106, passes through open valve 107, conduit 108, conduit 110 and conduit 112 to the space 81 which symbolizes space vaccum or the intake of a vacuum pump. At the same time some of the air and contamination product pass to the left, as indicated by flow arrow 104, passing out of the canister by manifold 20 and into conduit 114. It then flows through open valve 116 and conduit 118 to join the other flow in conduit 112 to vacuum. During this half-cycle conduit 120 is inactive, in the sense that nothing flows through it.

A detailed description of the flows indicated in FIG. 6 would be redundant, so the inventor will only point out that all the valves have been reversed in position, closing for the second half-cycle every valve that was open for the first, and vice versa. The effect of this synchronized switching is to now direct the flow of breathable air through cells 34 and 38 of the canister, which have been freshly purified as a result of their exposure to vacuum during the first half-cycle. At the same time, the vacuum purification means is switched for the second half-cycle to cells 36 and 40, to begin the job of drawing off the $CO_2$ and $H_2O$ absorbed and adsorbed on the granules detained in these cells during the first half-cycle.

What is claimed is:

1. In a breathable air circulation system a module for the control and purification of air, said module comprising an array of cells in which every other cell is connected in common to a first pair of opposed manifolds in said circulation system while the intermediate cells are connected to a second pair of manifolds in said circulation system, said cells in the array being separated from their neighbors only by an airsealing parting sheet of high thermal conductivity, each said cell being filled with a foamed metal comprising a continuous phase of metal wire of high heat conductivity defining a mass of sub-cells or small spaces forming a second continuous phase, a filling of granular material in at least the major portion of said foamed metal, such that the air flowing through said cell must flow through said granular material within the foamed metal, said granular material being sorbent to carbon dioxide at standard temperature and pressure but not to other gases in the air other than water vapor and also being desorbent to carbon dioxide and moisture at standard temperatures and vacuum pressures, and means in each cell between the connections of each cell to said manifolds to present the untoward leakage of said granules into said manifolds, said foamed metal in each cell contacting said parting sheets for the passage of heat therethrough and providing the principal structural strength for the cell.

2. The module of claim 1 in which said foamed metal in each cell is divided into a large center section and a pair of long outer sections disposed lengthwise one on either side of said center section, each said outer section having a narrow end and a broad end and diverging substantially uniformly from said narrow end to said broad end and forming with said center section a generally parallelepiped configuration with the broad end of one outer section being connected to one of said manifolds of a pair of manifolds while the broad end of the other outer section is connected to the diagonally opposed manifold, and said means to prevent untoward leakage of the granules comprises a pair of fine mesh metal screens characterized by openings of a size less than the size of said granules but just sufficient to prevent the passage of said granules therethrough, one of said screens being disposed between said center section and one of said outer sections and the other screen being disposed between said center section and the other outer section.

3. The module of claim 2 in which the metal portion of said foamed metal material occupies only about 4% of the available volume, the balance being space occupied by said granules of sorbent material.

4. The module of claim 1 wherein said granular material is granules of a polyethyleneimine coated on a substrate of polymerized divinylbenzene.

* * * * *